R. B. BENJAMIN.

EXTENSION SOCKET.

APPLICATION FILED JAN. 31, 1912.

Reissued Aug. 21. 1917.

14,343.

Witnesses:
G. W. Domaras Jr.
Charles G. Cope

Inventor:
Reuben B. Benjamin
By: Jones, Addington, Ames & Seibold
Attys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

EXTENSION-SOCKET.

14,343. Specification of Reissued Letters Patent. Reissued Aug. 21, 1917.

Original No. 953,217, dated May 17, 1910, Serial No. 509,185, filed July 23, 1909. Application for reissue filed January 31, 1912. Serial No. 674,614.

*To all whom it may concern:*

Be it known that I, REUBEN B. BENJAMIN, a citizen of the United States, residing at Chicago, in the county of Cook and State of Illinois, have invented new and useful Improvements in Extension-Sockets, of which the following is a full, clear, concise, and exact description, reference being had to the accompanying drawing, forming a part of this specification.

This invention relates to improvements in extension sockets for electric lamps, and particularly to that type of extension socket which is provided upon one of its ends with a plug adapted to be inserted into a stationary socket, and upon its opposite end with a receptacle adapted to receive the base of an electric lamp or the like. When the plug end of the device is inserted into a socket and a lamp is inserted into the receptacle end of the device the proper connections are made between the contacts of the stationary socket and the terminals of the lamp.

In some situations, and for certain kinds of electric lighting, it has been customary to install sockets which project but a short distance from the face of the wall or ceiling, such sockets having usually a casing or outer part composed of porcelain or other insulating material. In theater lighting, for instance, it is customary to arrange incandescent lamps on the ceiling, and the type of socket heretofore used for this purpose has usually been what is known as a "flush" socket, that is, a socket in which the principal part of the body thereof is above or behind the support, the feed wires leading to the sockets extending behind this support. Recently tungsten and other metal-filament lamps which require to be used in a vertical position have come into extensive use, and with these lamps it is desirable to employ a shade with each lamp, for the reason that such lamps project but a very small portion of the light given off thereby downward, almost all of the light being projected laterally from the lamp.

By the use of a properly constructed shade the light may be directed downward, and it is the principal object of the present invention to provide means whereby a shade and a lamp may be secured to and supported by a socket which is not adapted, without the use of my invention, for a shade. Where porcelain sockets are employed shade holders cannot be secured thereto as these sockets are not constructed with that end in view. This is of course particularly true where a flush socket is used, where no part of the socket, or at most but a very small part thereof, projects beyond the support. As metal-filament lamps are usually made in large sizes, as being more efficient than smaller units and as the shades employed with these lamps are usually heavy, it becomes necessary when such lamps and shades are carried by extension sockets, to so construct the extension sockets that they cannot become loosened by rotating in the direction to unscrew them from the stationary sockets when subjected to vibration. Means are therefore provided whereby the plug portion of the extension socket, when screwed into a stationary socket, is prevented from unscrewing and permitting the extension socket and the fixtures carried thereby to fall.

In the accompanying drawings—

Figure 2:
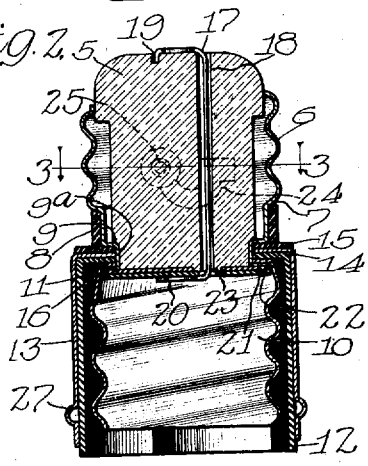
Fig. 2 is a vertical longitudinal sectional view of the extension socket.
Figure 4:
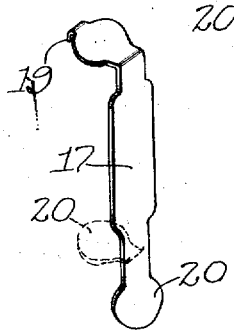
Figure 3:
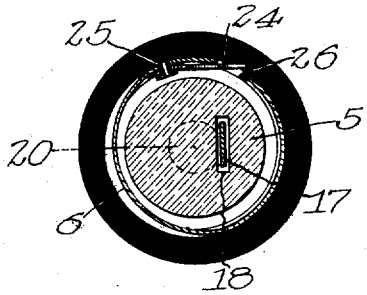

Fig. 3 is a cross sectional view of the upper part of the device, the section being taken on the line 3—3 of Fig. 2 looking downward; and Fig. 4 is a perspective view of a conducting strip, one end of which forms the center contact for the plug of the device while the other end forms the center contact for engagement with the center terminal of the lamp when screwed into the receptacle of the device.

In the several figures, wherein like reference numerals indicate the same parts throughout, 5 is a base formed of porcelain or the like and having a general cylindrical form, the upper end being, however, expanded to a slightly greater diameter than the main body portion thereof. This base is inserted from the top into a metallic shell 6 having screw threads rolled thereon to adapt it to be screwed into the Edison socket. This shell or sleeve has its lower portion contracted at 7, and extending around this contracted portion is an insulating ring 8. Below the portion 7 and the bottom of the ring 8 the sleeve is drawn inward to form a circular shoulder 9 upon which rests a shoulder on the base formed by lessening the diameter of the base near its lower end. From this point the sleeve extends downward as far as the lower end of the base and has, in this portion, an internal diameter substantially equal to the diameter of the smallest part of the base.

A second threaded metallic sleeve 10 forms the receptacle for receiving the base of a lamp. This sleeve has its upper and inner end flanged inward at 11, so that this member has the form of an inverted cup with a circular opening in the bottom thereof nearly as great in diameter as the interior of the socket. Surrounding the metallic threaded shell 10 is an insulating sleeve or shell 12, formed of vulcanized fiber or similar material. Surrounding the fiber shell 12 is a casing shell 13, preferably metallic. The insulating shell 12 and casing shell 13 are both flanged over inwardly at their upper ends, and between the flange 14 of the shell 13 and the shoulder 9 of the shell 6 is disposed a flat ring 15 of insulating material. This ring 15 is slightly smaller in diameter than the casing shell 13.

In assembling the device the ring 15 is first passed up over the portion $9^a$ of reduced diameter on the shell 6, after which the shells 13, 12 and 10 are successively placed in position. The lower end of the shell 6 is then flanged outwardly so as to firmly grip the ring 15 and the inturned portions of the shells 10, 12 and 13 between the outwardly flanged part 16 of the shell 6 and that part of said shell which forms the shoulder 9. Electrical connection, as well as firm mechanical connection, is thus made between the shell 6 and the shell 10, so that if the plug portion of the device, which comprises the shell 6 and base 5, be screwed into an Edison socket and a lamp be thereafter screwed into the shell 10, electrical connection will be made between the outer terminal of the lamp and the outer contact of the stationary socket into which the device is inserted. For making electrical connection between the center contact of the stationary socket and the center terminal of the lamp there is provided a center contact member which comprises a metallic strip 17 of the formation shown in Fig. 4. This strip is passed down through an aperture 18 which extends longitudinally through the base 5, the upper end of the strip 17 being bent over at right angles with the body thereof and lying upon the upper end of the base. A small lug 19 is formed on the extreme end of the strip 17, which lug is bent downward into a depression in the end of the base. This overcomes the tendency of the strip to rotate when the device is screwed into a socket. The lower end 20 of the strip 17 is bent over at a right angle with its body, and when so bent over, holds in position a pair of insulating disks 21 and 22. The disk 21 is provided with an opening into which extends a boss 23 formed on the lower end of the base 5, the disk being thereby prevented from turning in the socket. The second disk 22 has a slit through which passes the contact strip 17. After the parts have been assembled, the contact strip 17, being bent over upon the disks 21 and 22, holds these disks, as well as itself, in place.

In order to prevent the accidental separation of the device from the stationary socket into which it is screwed, or the gradual working out of the device under the influence of vibration to which it may be subjected, I provide a locking spring 24 which is secured at one of its ends by means of a hollow rivet 25 to the inner side of the threaded contact shell 6, the other end of this strip extending out through an opening 26 in the shell 6 in a line practically tangent to the inner side of the threaded shell 6. The resilient end of this plate extends in such a direction relative to the periphery of the plug that when the latter is screwed into a socket, the spring 24 offers practically no resistance to the rotary movement of the plug in the socket, but when it is attempted to unscrew the device from the socket the spring plate is thrust endwise against the inner surface of the socket. The spring plate is constructed preferably of steel or other hard metal and its end is cut so as to have square edges, these square edges being left intact in order that a firmer grip may be taken by the end of the spring upon the threaded interior of the socket. When it is desired to remove the device from the socket this may be done by the exercise of considerable force in unscrewing the device, but the spring offers sufficient resistance to this unscrewing motion to prevent any accidental displacement or any gradual unscrewing due to vibration. In certain of the claims I have used the expression "slip lock" for describing a lock having the above mentioned characteristic, that is, the characteristic of locking the plug or other device against rotation, and offering sufficient resistance to the unscrewing of the plug due to vibration, and at the same time not offering sufficient resistance to prevent the rotation of the plug by exercising considerable force in unscrewing the device. In other words, I have used the expression "slip lock" to describe an impositive lock.

Figure 1:
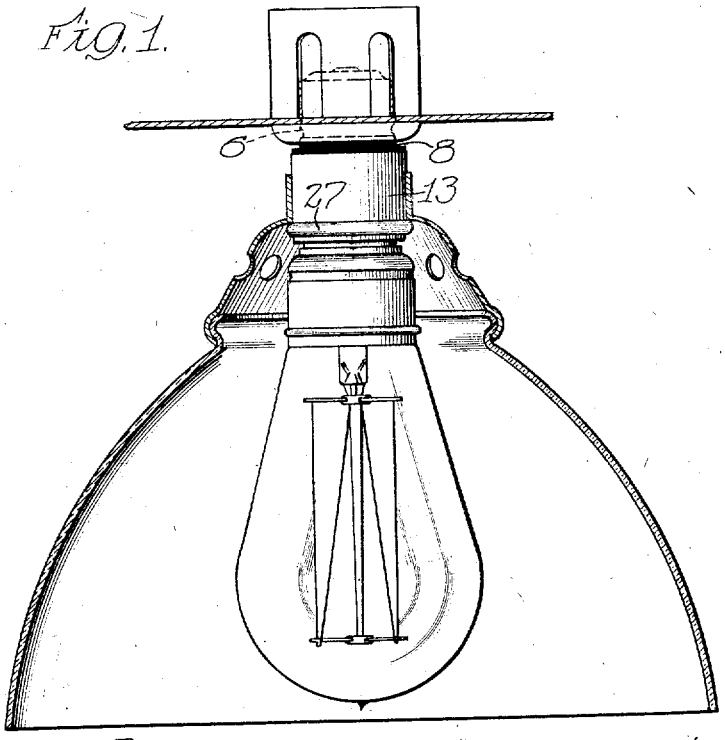
Figure 1 shows in elevation my improved extension socket and a lamp carried thereby, a shade and shade holder being shown in section and secured to the extension socket.

In order that a shade holder may be supported on the device the casing shell 13 which incloses the socket portion of the device is provided with a peripheral bead 27 which is rolled or stamped in the material of the casing when the latter is formed. A substantial shade holder sufficiently strong to carry any kind of shade that it may be desired to employ may be secured to the lower part of the device, as shown in Fig. 1, the flange 27 preventing the shade holder from being drawn off the lower end of the extension socket. Any suitable form of shade holder may evidently be used.

It will be seen that this device is of extremely simple construction and that the parts are so formed that they may be rapidly and easily assembled. The device is strong and perfectly adapted to support the heaviest kinds of lamps, shades and globes that are likely to ever be used. With the use of this device with old sockets, as installed before the need of shades arose, it is made possible to employ any form of shade desired.

Having thus described my invention, what I claim as new and desire to secure by Letters Patent, is:

1. The combination of a base having a passage extending longitudinally therethrough, a strip extending through said passage and having its ends bent over at a right angle with its body, a threaded contact extending around said base, and a threaded receptacle shell supported upon the lower end of said base and electrically connected with said threaded contact.

2. The combination of an insulating base having a longitudinally extending aperture, a threaded contact surrounding said base, a threaded receptacle shell supported at the lower end of said base and in electrical connection with said threaded contact, and a conducting strip extending through the longitudinally extending aperture of the base, the upper end of said strip serving as a center contact, the lower end of said strip being bent over upon the lower end of the base and serving as a center lamp terminal engaging contact.

3. The combination of a base, a threaded contact shell extending around said base, a threaded receptacle shell at the lower end of said base, said first-named shell being extended into said second-named shell and expanded therein to secure said shells together, and a conducting strip extending through said base for conducting current to the center terminal of a lamp.

4. The combination of a base having a shoulder near its lower end, a threaded contact shell extending around said base, a threaded receptacle shell below said base, said first-named shell having a portion of its body drawn in under said shoulder and thereafter expanded within said second-named shell, and means extending through said base for conducting current to the center terminal of a lamp.

5. The combination of a base having a shoulder near its lower end, a contact shell surrounding said base, a receptacle shell below said base and having an inturned flange at its upper end, an insulating shell surrounding said receptacle shell, a casing shell surrounding said insulating shell, said insulating shell and casing shell having each an inturned flange extending under the shoulder of the base, said contact shell being drawn in under said shoulder and thereafter expanded within said receptacle shell and thereby securing all of said shells together and electrically connecting said contact and receptacle shells.

6. The combination of an insulating base having a portion of its length of reduced diameter, a threaded contact shell surrounding said base and having a side aperture opposite the reduced portion of the base, and a spring strip secured at one of its ends upon the inner side of said contact shell and having its opposite end extending through said aperture to the exterior of said shell.

7. The combination of a threaded contact shell, having an aperture in its side, and a resilient strip secured upon the inner side of said shell and extending through said aperture for frictional locking engagement with the inner wall of a socket.

8. The combination of a threaded contact sleeve and a resilient strip secured thereto and extending tangentially therewith for locking engagement with the interior of a socket.

9. The combination of a plug, a receptacle shell carried thereby for receiving a lamp, and a slip locking member on said plug for engagement with the interior of a socket.

10. The combination of a threaded contact sleeve adapted for threaded engagement with a second threaded contact sleeve, said first-named sleeve having an aperture in its side, and a resilient strip secured to said first-named sleeve and extending through the aperture thereof, for frictional engagement with the second-named sleeve.

11. The combination of a threaded contact sleeve adapted for threaded engagement with a second threaded contact sleeve, and a resilient strip secured to the first-named contact sleeve and extending tangentially therewith in a direction of rotation opposite to that in which said first named sleeve is rotated when screwing it into said second named sleeve, whereby the end of said strip engages frictionally against said second named sleeve to prevent withdrawal of said first named sleeve therefrom.

In witness whereof, I have hereunto subscribed my name in the presence of two witnesses.

REUBEN B. BENJAMIN.

Witnesses:

CHARLES G. COPE,
MABEL REYNOLDS